United States Patent
Schroderus

(10) Patent No.: US 9,874,860 B2
(45) Date of Patent: Jan. 23, 2018

(54) PROVIDING USER INTERFACE OF A FREQUENCY CONVERTER OVER A WIRELESS CONNECTION

(71) Applicant: ABB Oy, Helsinki (FI)

(72) Inventor: Petri Schroderus, Helsinki (FI)

(73) Assignee: ABB Technology Oy, Helsinki (FI)

( * ) Notice: Subject to any disclaimer, the term of this patent is extended or adjusted under 35 U.S.C. 154(b) by 641 days.

(21) Appl. No.: 14/326,995

(22) Filed: Jul. 9, 2014

(65) Prior Publication Data

US 2015/0019033 A1    Jan. 15, 2015

(30) Foreign Application Priority Data

Jul. 12, 2013 (EP) .................. 13176266

(51) Int. Cl.
- *G06F 19/00* (2011.01)
- *G05B 15/02* (2006.01)
- *H04L 29/08* (2006.01)

(52) U.S. Cl.
CPC ............ *G05B 15/02* (2013.01); *H04L 67/125* (2013.01)

(58) Field of Classification Search
CPC ...... H02M 7/53873; H02M 7/48; H02M 7/44; G05B 15/02; H04L 67/125
See application file for complete search history.

(56) References Cited

U.S. PATENT DOCUMENTS

| | | | | |
|---|---|---|---|---|
| 5,810,657 A | * | 9/1998 | Pariseau | F24F 11/0076 454/61 |
| 2001/0047125 A1 | | 11/2001 | Quy | |
| 2004/0030226 A1 | | 2/2004 | Quy | |
| 2004/0176923 A1 | * | 9/2004 | Shank | G01R 31/2822 702/108 |
| 2005/0195537 A1 | * | 9/2005 | Virolainen | G05B 19/0426 361/18 |
| 2005/0250995 A1 | | 11/2005 | Quy | |
| 2006/0109505 A1 | * | 5/2006 | Ha | H04N 1/00244 358/1.15 |
| 2007/0293733 A1 | | 12/2007 | Quy | |
| 2009/0069643 A1 | * | 3/2009 | Quy | G06F 19/3406 600/300 |

(Continued)

OTHER PUBLICATIONS

Search Report dated Nov. 1, 2013, by the European Patent Office for Application No. 13176266.

*Primary Examiner* — Michael D Masinick

(74) *Attorney, Agent, or Firm* — Taft Stettinius & Hollister LLP

(57) ABSTRACT

A user interface of frequency converter over a wireless connection is disclosed. The frequency converter can be connected to a mobile communications device over a short range wireless connection. The mobile communications device can be connected to a wide area network to a service center maintaining information associated with frequency converters. Operational information of the frequency converter can be relayed to the service center over the wide area network as a view of the frequency converter user interface. The frequency converter can be controlled by control commands from the mobile communications device, the control commands being determined based on selections received from the service center, in response to the view conveyed to the service center.

23 Claims, 2 Drawing Sheets

(56) References Cited

U.S. PATENT DOCUMENTS

| | | | |
|---|---|---|---|
| 2009/0207893 A1* | 8/2009 | Leutgeb | H04B 5/0037 375/219 |
| 2010/0274903 A1* | 10/2010 | Wookey | G06F 3/1454 709/227 |
| 2013/0082098 A1* | 4/2013 | Tam | G06F 9/44505 235/375 |
| 2014/0265579 A1* | 9/2014 | Mumtaz | H02M 7/42 307/43 |

* cited by examiner

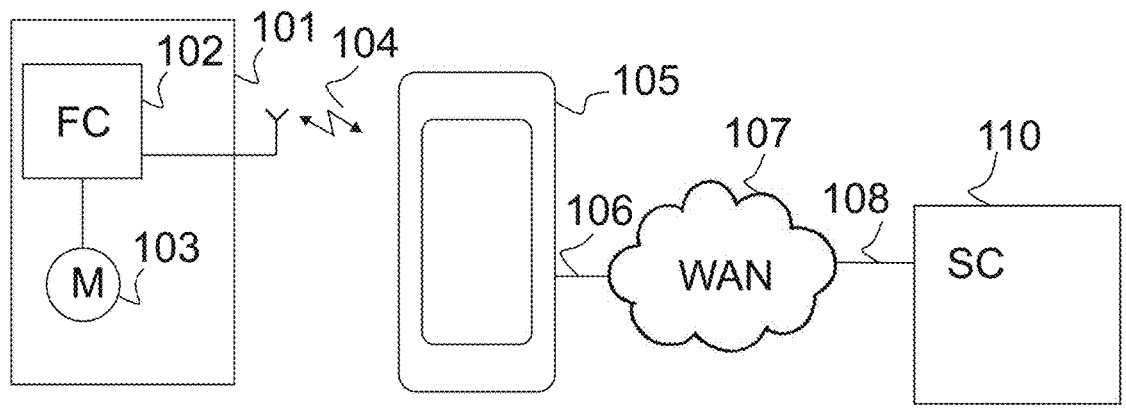
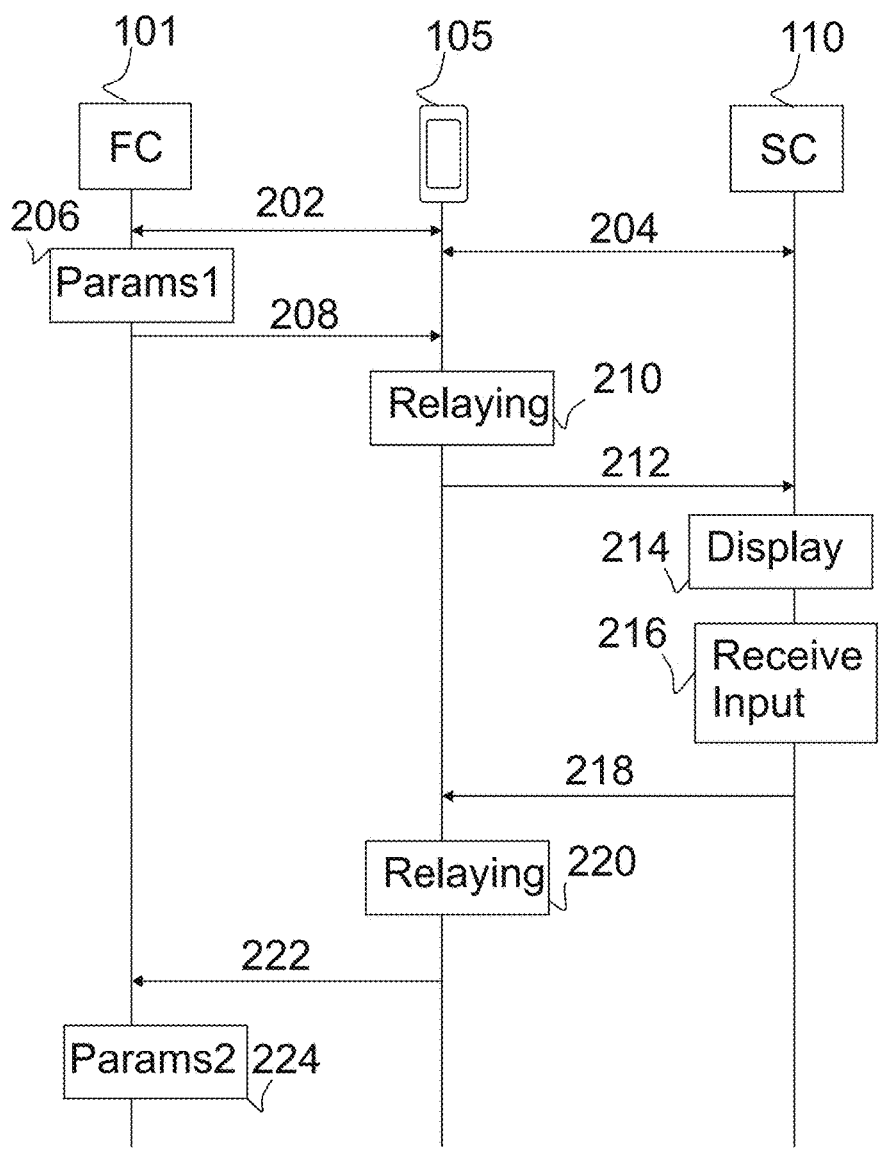
Figure 1
Figure 2

US 9,874,860 B2

PROVIDING USER INTERFACE OF A FREQUENCY CONVERTER OVER A WIRELESS CONNECTION

RELATED APPLICATION

This application claims priority under 35 U.S.C. §119 to European Patent Application No. 13176266.8 filed in Europe on Jul. 12, 2013, the entire content of which is hereby incorporated by reference in its entirety.

FIELD

The present disclosure relates to frequency converters used to control frequency of electrical power, and for example to operations and maintenance of such frequency converters.

BACKGROUND INFORMATION

The following background description art may include insights, discoveries, understandings or disclosures, or associations together with disclosures not known to the relevant art prior to the present invention but provided by the present disclosure. Some such contributions disclosed herein may be specifically pointed out below, whereas other such contributions encompassed by the present disclosure the invention will be apparent from their context.

Frequency converters are used to change frequency and magnitude of electrical supplied to a load. Frequency converters have been used in Alternating Current AC motor drives. In exemplary operation, a frequency converter receives AC current from an electrical power supply and converts the frequency of the received AC current to another frequency after which the AC current is supplied to an AC electric motor. Also further parameters, for example a voltage level, of the received AC current may be changed. The AC motors are used in various applications including but not limited to fans and pumps. In many applications the use of frequency converters can provide significant energy savings compared to supplying electrical power having a constant frequency.

Known frequency converters are configured to meet specific needs of their operating environment. The operating environment may be defined by the properties of electric motors driven by the frequency converters and application areas of the electric motors. Accordingly, the frequency converter may be configured by parameters that match a specific operating environment. These parameters may be defined by properties of the equipment the frequency converter drives either directly or indirectly, for example properties of the electric motors and pumps or fans driven by the electric motor.

The development of frequency converters and the application areas can involve complexity that involves highly qualified personnel to be properly managed. However, in case of problems in operating a frequency converter, for example in case of a fault, arrival of the highly qualified personnel may introduce a delay to the operation of the frequency converter. Meanwhile, the frequency converter and its associated drive system are out of operation, which reduces efficiency of their use.

During downtime of the frequency converter productivity can be degraded in the application area of the frequency converter. For example, a downtime of the frequency converter may cause a pump driven by the frequency converter to be stopped in a desalination process, whereby supply of desalinated water may be stopped. In another example, a downtime of the frequency converter may cause a fan driven by the frequency converter to be stopped, whereby people residing within the ventilated facilities, structures of the ventilated facilities as well as industrial processes depending on the ventilation may be may be jeopardized.

SUMMARY

A method of remotely operating a frequency converter for a mobile communications device is disclosed that includes a user interface for displaying information to a user and communications means for connecting to end points on a short range wireless connection and over a wide area network, wherein the method comprises: establishing a short range wireless connection to a frequency converter that is configured to receive electrical power having a first frequency, and output electrical power having a second frequency; establishing a connection over a wide area network to a service center maintaining information associated with frequency converters; receiving operational information from the frequency converter; and relaying the received operational information to the service center.

A method of remotely operating a frequency converter that is configured to receive electrical power is also disclosed having a first frequency and output electrical power having a second frequency, wherein the frequency converter includes communications means for establishing connections to end points over a short range wireless connection, the method comprising: establishing a short range wireless connection to a mobile communications device; transmitting operational information of the frequency converter to the mobile communications device; receiving control commands for the frequency converter from the mobile communications device, said control commands being determined based on selections received from a service center maintaining information associated with frequency converters, in response to a view of a user interface of the frequency converter conveyed to the service center.

A method of remotely operating a frequency converter by a service center maintaining information associated with frequency converters, and having a user interface for displaying data and for receiving user input, and communications means for establishing a connection to a mobile communications device over a wide area network, the frequency converter being configured to receive electrical power having a first frequency and output electrical power having a second frequency is also disclosed, wherein the method comprises: receiving from the mobile communications device a view of the frequency converter user interface, said mobile communications device being connected to the frequency converter over a short range wireless connection; displaying the view; receiving input to the displayed view; determining at least one part of the view corresponding to the received input; and transmitting the received input and information identifying the determined part of the view corresponding to the received input for controlling the frequency converter.

A mobile communications device is also disclosed, comprising: a user interface for displaying information to a user; communications means for connecting to end points on a short range wireless connection and over a wide area network, and at least one processor; and at least one non-transitory memory including a computer program code, wherein the at least one memory and the computer program code are configured for, with the at least one processor, user interface and communications means at least: establishing a short range wireless connection to a frequency converter that is adapted to receive electrical power having a first frequency and output electrical power having a second frequency; establishing a connection over a wide area network to a service center maintaining information associated with frequency converters; receiving operational information from the frequency converter; and relaying received operational information to the service center.

A frequency converter configured for receiving electrical power having a first frequency and outputting electrical power having a second frequency is also disclosed, comprising: communications means for establishing connections to end points over a short range wireless connection; and at least one processor and at least one non-transitory memory including a computer program code, wherein the at least one memory and the computer program code are configured for, with the at least one processor, and communications means at least: establishing a short range wireless connection to a mobile communications device; transmitting operational information of the frequency converter to the mobile communications device; and receiving control commands for the frequency converter from the mobile communications device, said control commands being determined based on selections received from a service center maintaining information associated with frequency converters, in response to a view of the user interface of the frequency converter conveyed to the service center.

A service center for maintaining information associated with frequency converters, is also disclosed comprising: a user interface for displaying data and for receiving user input; communications means for establishing a connection to a mobile communications device over a wide area network, said frequency converters being adapted to receive electrical power having a first frequency and output electrical power having a second frequency; and at least one processor and at least one memory including a computer program code, wherein the at least one non-transitory memory and the computer program code are configured for, with the at least one processor, user interface, and communications means, at least: receiving from the mobile communications device a view of the frequency converter user interface, said mobile communications device being connected to the frequency converter over a short range wireless connection; displaying the view; receiving input to the displayed view; determining at least one part of view corresponding to the received input; and transmitting the received input and information identifying the determined part of the view corresponding to the received input for controlling the frequency converter.

A computer program embodied on a non-transitory distribution medium is also disclosed, having program instructions which, when loaded into a mobile communications device that has a user interface for displaying information to a user and communications means for connecting to end points on a short range wireless connection and over a wide area network is also disclosed, will cause execution of steps comprising: establishing a short range wireless connection to a frequency converter that is adapted to receive electrical power having a first frequency and output electrical power having a second frequency; establishing a connection over a wide area network to a service center maintaining information associated with frequency converters; receiving operational information from the frequency converter; and relaying the received operational information to the service center.

A computer program embodied on a non-transitory distribution medium is also disclosed, having program instructions which, when loaded into a frequency converter that is adapted to receive electrical power having a first frequency and output electrical power having a second frequency, wherein the frequency converter includes communications means for establishing connections to end points over a short range wireless connection, will cause execution of steps comprising: establishing a short range wireless connection to a mobile communications device; transmitting operational information of the frequency converter to the mobile communications device; and receiving control commands for the frequency converter from the mobile communications device, said control commands being determined based on selections received from a service center maintaining information associated with frequency converters, in response to a view of a user interface of the frequency converter conveyed to the service center.

A computer program embodied on a non-transitory distribution medium is also disclosed, having program instructions which, when loaded into a service center maintaining information associated with frequency converters and including a user interface for displaying data and for receiving user input, and communications means for establishing a connection to a mobile communications device over a wide area network, will cause execution of steps comprising: receiving from the mobile communications device a view of the frequency converter user interface, said mobile communications device being connected to the frequency converter over a short range wireless connection; displaying the view; receiving input to the displayed view; determining at least one part of view corresponding to the received input; and transmitting the received input and information identifying the determined part of the view corresponding to the received input for controlling the frequency converter.

A drive system is also disclosed comprising: a frequency converter configured for receiving electrical power having a first frequency and outputting electrical power having a second frequency to an electric motor, wherein the frequency converter includes communications means for establishing connections to end points over a short range wireless connection, and at least one processor and at least one non-transitory memory including a computer program code, wherein the at least one memory and the computer program code are configured for, with the at least one processor and the communications means, at least: establishing a short range wireless connection to a mobile communications device; transmitting operational information of the frequency converter to the mobile communications device; and receiving control commands for the frequency converter from the mobile communications device, said control commands being determined based on selections received from a service center maintaining information associated with frequency converters, in response to a view of a user interface of the frequency converter conveyed to the service center by the mobile communications device, when a mobile communications device is connected to the frequency converter by the short range wireless connection.

BRIEF DESCRIPTION OF THE DRAWINGS

In the following, features disclosed will be described in greater detail by way of preferred exemplary embodiments with reference to the attached drawings, in which:

FIG. 1 illustrates a general architecture of a drive system communicating with a service center, according to an exemplary embodiment;

FIG. 2 illustrates processes and associated communication according to an exemplary embodiment;

DETAILED DESCRIPTION

Figure 3A:
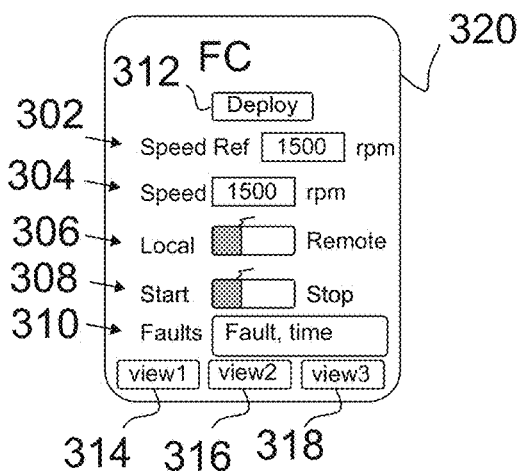
FIG. 3a illustrates a user interface of a frequency converter, according to an exemplary embodiment.

The following presents a simplified summary of features disclosed herein to provide a basic understanding of some exemplary aspects of the invention. This summary is not an extensive overview of the invention. It is not intended to identify key/critical elements of the invention or to delineate the scope of the invention. Its sole purpose is to present some concepts disclosed herein in a simplified form as a prelude to a more detailed description.

Various exemplary embodiments include methods, apparatuses, computer program products and a drive system.

According to an exemplary aspect, a method is disclosed for a mobile communications device that can include a user interface for displaying information to a user and communications means for connecting to end points on a short range wireless connection and over a wide area network, wherein the method can include establishing a short range wireless connection to a frequency converter that is adapted to receive electrical power having a first frequency and output electrical power having a second frequency, establishing a connection over a wide area network to a service center maintaining information associated with frequency converters, receiving operational information from the frequency converter, and relaying the received operational information to the service center.

According to an exemplary aspect there is provided a method for a frequency converter that is adapted to receive electrical power having a first frequency and output electrical power having a second frequency, and the frequency converter includes communications means for establishing connections to end points over a short range wireless connection, the method including establishing a short range wireless connection to a mobile communications device, transmitting operational information of the frequency converter to the mobile communications device, receiving control commands for the frequency converter from the mobile communications device, the control commands being determined on the basis of selections received from a service center maintaining information associated with frequency converters, in response to a view of the user interface of the frequency converter conveyed to the service center.

According to an exemplary aspect there is provided a method of remotely operating a frequency converter by a service center maintaining information associated with frequency converters and including a user interface for displaying data and for receiving user input and communications means for establishing a connection to a mobile communications device over a wide area network, said frequency converter being adapted to receive electrical power having a first frequency and output electrical power having a second frequency, wherein the method includes receiving from the mobile communications device a view of the frequency converter user interface, said mobile communications device being connected to the frequency converter over a short range wireless connection, displaying the view, receiving input to the displayed view, determining at least one part of view corresponding to the received input, and transmitting the received input and information identifying the determined part of the view corresponding to the received input for controlling the frequency converter.

According to an exemplary aspect there is provided an apparatus having means to perform the steps of a method according to each aspect.

According to another exemplary aspect there is provided an apparatus having at least one processor, and at least one non-transitory memory including computer program code, the at least one memory and the computer program code configured to, with the at least one processor, cause the apparatus at least to perform a method according to each aspect.

According to another exemplary aspect there is provided a computer program product having executable code that when executed, will cause execution of functions of a method according to each aspect.

According to another exemplary aspect there is provided a drive system having an apparatus according to an aspect operating as a frequency converter and arranged to supply electrical power to an electric motor, wherein a view of the user interface of the frequency converter is relayed to a service center, when an apparatus according to an aspect operating as a mobile communications device is connected to the frequency converter by the short range wireless connection.

Although the various aspects, embodiments and features disclosed herein are recited independently, it will be appreciated that all combinations of the various aspects, embodiments and features disclosed herein are possible and within the scope of the present invention as claimed.

Some exemplary aspects provide remote control of a frequency converter. A service center can control the frequency converter, when a mobile communications device relaying a view of the frequency converter user interface is within a range of a short range wireless connection of the frequency converter. In this way the user of the mobile communications device can observe the frequency converter and operating environment of the frequency converter for safety during the time the frequency converter is under remote control.

According to an exemplary aspect a selection element is provided on the user interface of the mobile communications device to select when the remote control is switched on. In this way the remote control by the service center may be performed only, when the user of the mobile communications device is present and the mobile communications device is within a range of the short range wireless connection from the frequency converter.

In various embodiments, remote management of a frequency converter is provided such that one or more parameters of the frequency converter for example one or more from an output voltage, output frequency and application specific information, for example a torque and/or rotation speed, may be selected via a user interface of the frequency converter displayed on a mobile communications device and/or a service center.

FIG. 1 illustrates a general architecture of a drive system 101 communicating with a Service Center SC 110, according to an exemplary embodiment disclosed herein. This architecture provides remote management of the drive system, for example a Frequency Converter FC 102 of the drive system, when a Mobile Communications Device MCD 105 is within a range of short range wireless connection 104 from the drive system.

The drive system can include an electric motor 103, for example an AC motor, and a frequency converter 102. The frequency converter has an input, where it receives electrical power from an electrical power supply. The frequency converter has an output that supplies electrical power obtained by converting the frequency and/or further characteristics of the electrical power received in its input. The electrical power supplied by the frequency converter can have a different frequency than the input electrical power, since the frequency of the input electrical power is converted by the frequency converter to match properties of the electrical motor and/or properties of a pump or fan driven by the electric motor.

The frequency converter can include communications means for communicating with the mobile communications device 105 over a short range wireless connection 104. The communications means may be provided by an adapter and/or an antenna that is connected to the frequency converter. The short range wireless connection may include a Bluetooth connection, a Wireless Local Area Network WLAN connection, an infrared connection or a Near Field Communications NFC connection. The WLAN connection can, for example, conform to the IEEE 802.11 family of specifications, however, also other specifications may be used to implement the WLAN connection.

The connections between the drive system and the frequency converter are electrical connections that provide transmission of electrical power and/or communications.

A short range wireless connection has, for example, a range that allows a person holding the mobile communications device to visually observe the frequency converter. The above explained connection types for the short range wireless connection provide such a range. For example, the IEEE 802.11 WLAN can have a range of 35 m indoors. The ranges of Bluetooth and NFC are for example, even shorter than the range provided by IEEE 802.11 WLAN. NFC connections have even shorter ranges that may even require a touch between the communicating devices. Infrared connection can involve a direct connection without obstacles, whereby the distance between the mobile communications device and the frequency converter that are connected by an infrared connection, can, for example, be limited to 10 m, especially when frequency converters deployed indoors are considered.

The MCD may include a user interface for displaying information to a user carrying the MCD and communications means for establishing connections over the short range wireless connection and over a wide area network. The user interface may be provided as a graphical user interface on a display of the MCD for representing information visually to the user. The user interface may include input means, for example one or more buttons, for receiving input from the user of the mobile communications device. Alternatively or additionally, a touchscreen may be used to implement the functionalities (e.g., input and output means), of the user interface.

The service center may include a user interface for displaying data and for receiving user input. The service center may be a computer equipped with a display and conventional computer accessories for operating the computer (e.g., a keyboard and a mouse). A touch screen may be used in the service center similar to the MCD, to provide the user interface.

Accordingly, the MCD may include a portable terminal device that establishes and maintains connections in a communications network and/or directly to one or more other terminals or computers. The communications network may include a wired or wireless access network, for example Ethernet based Local Area Network or a mobile communications network.

Following the illustration of FIG. 1, the MCD can be connected directly to the frequency converter by the short range wireless connection and over a wide area network 107 to a service center 110 that maintains information associated with frequency converters. Accordingly, for the MCD, the service center can be an end point of the wide area network connection and the frequency converter can be an end point of the short range wireless connection. The MCD can connect to a wide area network WAN 107 on a wired or wireless connection 106 and the service center connects to the WAN over a wired or wireless connection 108. The connections 106, 108 to the WAN may conform to a standard used to implement the WAN or a part of the WAN. The WAN or a part of the WAN may be implemented as a communications network conforming to a communications standard for example: Ethernet, Internet Protocol version 4, Internet Protocol version 6, Global System for Mobile Communications (GSM), Universal Mobile Telecommunications System UMTS, Long Term Evolution LTE and LTE Advanced. Accordingly, the MCD and the service center may be terminals operating according to one or more of the above defined communications networks.

The WAN can, for example, cover broad areas, for example regions or countries, thereby providing connections between different geographical locations. The WAN may include sub-networks connected together by routers that route traffic between the sub-networks. The sub-networks may include access networks providing wired or wireless connectivity. The access networks may connect the MCD and the service center to the WAN. Examples of the access networks include wireless communications networks conforming to the above-mentioned standards and wired access networks, such as the Ethernet based Local Area Networks LANs.

FIG. 2 illustrates processes and associated communication according to an exemplary embodiment. FIG. 2 is explained with reference to entities described above with FIG. 1. The entities 101, 105, 110 involved in the processes are switched on and operational. A process performed by each entity may be read by following the vertical line extending downwards from the respective entity.

In 202 a short range wireless connection is established between the frequency converter 101 and the MCD 105. The connection is established, when the frequency converter and the MCD are close enough to allow reception of data over the short range wireless connection (e.g., within the range of the short range communications).

In 204 a connection over the WAN to the service center 110 is established.

The connections may be established and communications on the connections may be performed by using protocols and operational procedures that are inherent, at least by the communications standards and/or specifications, to the type of the WAN and the short range wireless connection.

In 206 operational information of the frequency converter can be maintained at the frequency converter. The operational information may include configuration information, for example parameters, fault information, a rotation speed of the electric motor and/or a reference rotation speed of the electric motor. The operational information may be maintained constantly by the frequency converter, when it is operational, and even before connecting to the MCD.

In 208, the operational information of the frequency converter is transmitted to the MCD on the short range wireless connection.

In 210, 212 the operational information received from the frequency converter is relayed to the service center over a wide area network. The operational information may be processed 210 by the MCD to provide a visual representation of the operational information both at the MCD and the service center. The visual representation may be a user interface displayed on the mobile device or a view of the user interface of the frequency converter. The view and the user interface may be generated by the MCD on the basis of the operational information.

For example, the view of the user interface is relayed to the service center for displaying 214. At the service center, the displayed view may be used by maintenance personnel to obtain operational information of the frequency converter. The service center maintains information on frequency converters, which may include configuration information of frequency converters. The configuration information may include type and application specific configurations for the frequency converters. Also fault information and fault handling information may be maintained for solving and analyzing faults that occur in the frequency converters.

It should be appreciated that in various exemplary embodiments, where the user interface of the frequency converter is provided on the MCD or a view of the frequency converter user interface is relayed by the MCD to allow remote operations to the service center, the MCD may be considered as a part of the frequency converter or the drive system that includes the frequency converter.

The user interface may include one or more visual elements. The visual elements may be used to display some of the operational information of the frequency converter and/or to receive input associated with the elements from the user. The user interface may be displayed on the MCD. However, it should be appreciated that the displaying may not be necessary, for example, when the user interface is provided by a software application that is executed at the background of the operating system running on the MCD. Moreover, the display of the MCD may be switched off by the user or to save battery power, that is, can be very limited in mobile devices. On the other hand, some other application, for example a phone application, may be displayed on the MCD, while the frequency converter user interface may be in the background.

A view of the frequency converter user interface may include only a portion of the elements and/or only a portion of the functionalities of the frequency converter user interface. It should be appreciated that it is also possible that the view may provide the same control over the frequency converter as the MCD. However, since the user interface is hosted by the MCD, the user of the MCD may make selections at the MCD which prevail over the selections made via the view.

Accordingly, while the actual user interface is hosted at the MCD, a view (e.g., a representation of the user interface) can be generated to allow remote persons, under the discretion of the user of the MCD, to control the frequency converter. The discretion of the user of the MCD may be applied by the user positioning the MCD within the range of the short range wireless connection of the frequency converter. When the user positions the MCD outside the range of the short range wireless connection, communications between the frequency converter and the MCD is interrupted and the frequency converter cannot be controlled by the service center or the MCD. In this way security to the control of the frequency converter may be provided, since possible operations on the frequency converter can for example, only be effected via the user interface at the MCD and via the view at the service center, when the MCD and the person carrying it, are located sufficiently close to the frequency converter for the short range wireless communications. Consequently, the range of the short range wireless connection ensures that the person carrying the MCD is able to visually monitor the frequency converter, while the control of the frequency converter is enabled to the service center.

In 216, the user input is received to the displayed view. The user input may be entered by the maintenance personnel at the service center via the service center user interface.

Accordingly, the user input of the maintenance personnel may be received to the user interface displayed of the service center. The user input may be associated to a location on the service center user interface. The location may include a visual element of the service center user interface, for example a selection element or a button. The user interface of the service center may include the view received from the MCD. However, it should be appreciated that the user interface may include other information that is specific to the service center, such as information related to applications being executed at the service center or further views of other frequency converter user interfaces.

In an exemplary embodiment, it is determined at least one part of the frequency converter user interface view that corresponds to the received user input on the service center user interface. The determined part of the view may be expressed as an x-y-location defining for example pixels of the view.

The user input received at a location on the service center user interface may be mapped to a location of the frequency converter user interface view. In the mapping coordinate system transformation may be applied, where a relationship is defined between locations of the service center user interface and locations of the view.

In 218, the received input at the service center and the determined part of the view are transmitted to the MCD for controlling the frequency converter.

In 220 the user input and information identifying an associated part of the frequency converter user interface view is received at the MCD. The received information from the service center may define one or more selections on the view entered by the service center maintenance personnel.

The received one or more selections are used to determine one or more selections of the frequency converter user interface. The determining may include mapping the received information identifying a part of the view to a location on the frequency converter user interface hosted by the MCD. The information identifying the part of the view may include a location expressed as an x-y-location, as above. Accordingly, a coordinate system transformation may be used to map locations of the view to locations on the user interface.

A selection may include a mouse click on a defined location, text entered in a text box in a defined location, or a gesture of the user in a defined location or a combination of the previous. The gestures of the user may include a touch detected on a touch screen and/or a movement of a user's touch.

Once the location on the frequency converter user interface associated with the received selection information has been determined, a control command of the frequency converter may be determined. The determining may be performed by applying the selections associated with the view received from the service center to the frequency converter user interface at the MCD.

One or more control commands may be generated based on the selections on the frequency converter user interface. The frequency converter is controlled by the generated control commands which are communicated 222 over the short range wireless connection to the frequency converter. The control commands may include instructions, for example an instruction to set one or more parameters of the frequency converter. Accordingly, the configuration of the frequency converter may be set on the basis of the selections on the user interface at the MCD or selections on the user interface view at the service center.

In an exemplary embodiment, in 220 it may be determined that the selection information received from the service center does not correspond to a control command of the frequency converter. The received selection information may relate only to the user interface hosted by the MCD, whereby in response to the selection information, only a new or updated view of the frequency converter user interface may be transmitted to the service center as described by steps 210 to 212 for displaying 214.

In 224, the frequency converter operates according to the control command received in 222. The operation may include operating according to the new parameters received, for example.

It should be appreciated that processes illustrated in FIG. 2 or one or more parts of the processes may be repeated without executing further steps of the processes. For example, when the user interface of the frequency converter is changed, the changes are propagated to the view of the frequency converter user interface. The new view may be communicated 212 to the service center, whereby the maintenance personnel at the service center may make selections on the new view.

Accordingly, although the FIG. 2 illustrates issuing a single control command 222 to the frequency converter, it should be appreciated that also one or more further control commands may be issued by the input from maintenance personnel and steps 216 to 222.

FIG. 3a illustrates a user interface 320 of a frequency converter, according to an exemplary embodiment. The user interface may include a display of the MCD. The user interface may include visual elements, for example selection elements 306, 308, text input and output fields 302, 304, fault information 310, buttons 312, and views 314, 316, 318 for different functions and/or display of different information. Configuration information, for example parameters, fault information, a rotation speed of the electric motor and/or a reference rotation speed of the electric motor may be displayed by the visual elements that may be arranged into a single view of distributed into different views 314, 316, 318.

In one example, the user interface can include a selection element 306 having a 'Remote' position, where a view of the user interface is relayed to the service center and a 'Local' position, where the user interface is local to the MCD. The view may be relayed depending on the position of the selection element as described in the processes of FIG. 2. In FIG. 3a, the selection element has a shaded area on the left, whereby the user interface is local. When the shaded element is moved by the user input to the right, the view of the user interface is relayed to the service center, for example as described in 210 and 212 in FIG. 2. When the user interface is implemented by a touch screen the movement of the shaded element may be provided by a gesture of the user known as "sliding", where the shaded element is touched and the touch is maintained while moving the touching finger towards a desired destination on the selection element.

In another example, the user interface includes a selection element 308 having a 'Stop' position, where the frequency converter is switched off and a 'Start' position, where the frequency converter is switched on. The frequency converter is on, when the shaded area of the selection element is on the left and the frequency converter may be switched off by moving the shaded area from left to right, similar as explained with item 306 above. Accordingly, the selection element 308 operates as an on/off switch. It should be appreciated that the switching the frequency converter off may not entirely stop operation of the frequency converter, but user interface functionality may remain active, allowing the frequency converter to be switched back on by the user interface on the MCD.

For example, the text output field 304 shows current speed of electric motor driven by the frequency converter and the text output field shows a reference speed of the electric motor.

Further information may be displayed by selecting different views by the user selecting the view elements 314 to 318.

Figure 3B:
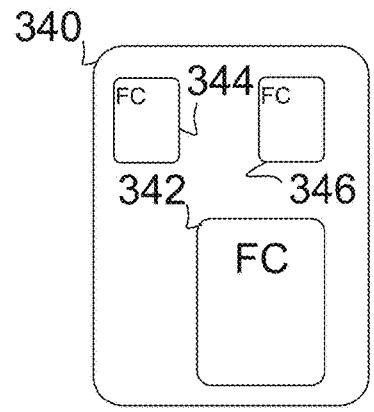
FIG. 3b illustrates a user interface of a service center, according to an exemplary embodiment.

FIG. 3b illustrates a user interface 340 of a service center, according to an exemplary embodiment. The user interface of the service center may include a display of a data processing device, for example a computer. The computer may be executing several applications each of which may have its own view 342, 344, 346 on the service center user interface. A view 342 of the frequency converter user interface may be received from the MCD as described by the processes in FIG. 2. In one example, the different views are views of frequency converter user interfaces to different frequency converters. All the views may be obtained to the service center according to the processes of FIG. 2. In addition to the view of the user interface of the frequency converter, also other information may be displayed, such as technical data, fault management processes and as well as views of other frequency converter user interfaces. Thereby, the maintenance personnel may observe a plurality of frequency converters at a time.

Figure 4:
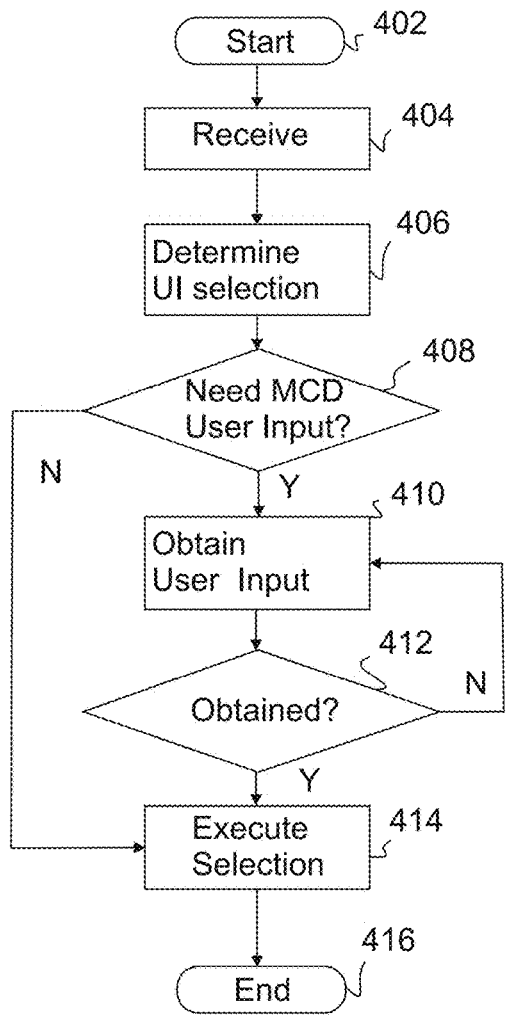
FIG. 4 illustrates an exemplary process of controlling a frequency converter by a user interface over a short range wireless connection and selections received on a view generated of the user interface.

FIG. 4 illustrates an exemplary process of controlling a frequency converter by a user interface over a short range wireless connection and selections received on a view generated of the user interface. The process may be performed by a MCD, when it is connected over short range wireless connection to the frequency converter and to a service center over a wide area network, for example according to the architecture of FIG. 1. The process illustrated in FIG. 4 may be performed in the process of FIG. 2, after receiving 218 selection information from the service center.

The process of FIG. 4 may start 402, when the MCD has established connections to the frequency converter and the service center, and a view of the frequency converter user interface is being relayed to the service center, as described in steps 202 to 214 in FIG. 2.

In 404 selection information is received from the service center similar to step 218 in FIG. 2.

In 406 it is determined, whether the received selection information should receive or require input from the user of the MCD. The received selection information may be processed as described in 220 in FIG. 2 to determine selections of the frequency converter user interface. The user input may provide authorization of the remote selections made by the service center.

In one example, the type of the received selection information may be used to determine whether input from the user of the MCD is desired or needed. The received selection information may define a selection on the frequency converter user interface which sets new operational parameters to the frequency converter. The new operational parameters may be defined on the basis of a particular type of frequency converter and/or specific to an application of the frequency converter, for example the parameters may be at least partly specific to a particular pump or a fan. Accordingly, before new parameters are set to the frequency converter, the input to the user may be needed to confirm that the type of the frequency converter and/or the requirements of the application (e.g., the pump or the fan) are met.

If no input is needed 408 from the user of the MCD, the process proceeds to 414, where the selection is executed. The execution may include determining a control command that is transmitted to the frequency converter as described in steps 222 and 224 in FIG. 2.

If user input is needed 408, this may be obtained via the user interface of the MCD. Since the person using the MCD is located on-site the frequency converter, the person may verify the particularities concerning the frequency converter and its application, for example a pump. The user input may be requested from the user by a visual element on the MCD display that prompts the user to answer 'Yes' or 'No' to the determined 406 frequency converter user interface selection. It is possible that the prompting the verification request can be effected also by using other user interface means, for example synthesized voice. Also, the verification of the user may be input using input means for example, voice, touch, key press and mouse click.

When the input is received 412 from the user, the process may proceed to 414, where the user interface selection is executed according to the authorization received from the user. Accordingly, if the user interface selection was authorized, it may be performed as described in steps 222 and 224 in FIG. 2. However, if the user interface selection was not authorized, not control commands are necessary to the frequency converter and a new or updated view of the frequency converter user interface may be transmitted to the service center as described by steps 210 to 212 for displaying 214. If no input is received from the user, input of the user may be waited in 410.

It should be appreciated that the user input may be received also without a direct input from the user to the user interface of the MCD. In an embodiment, the verification may comprise the MCD user reading an NFC tag by the MCD. If the NFC tag matches with the user interface selection, the user interface selection may be executed 414. Accordingly the user interface selection may comprise information identifying a type of frequency converter, a specific pump and/or their parameters. When 412 the information read from the NFC tag matches with the information included in the user interface selection, the user interface selection may be executed 414.

In 416, the desired (e.g., required) user input is received from an on-site person to the user interface selection and the process ends.

Figure 5A:
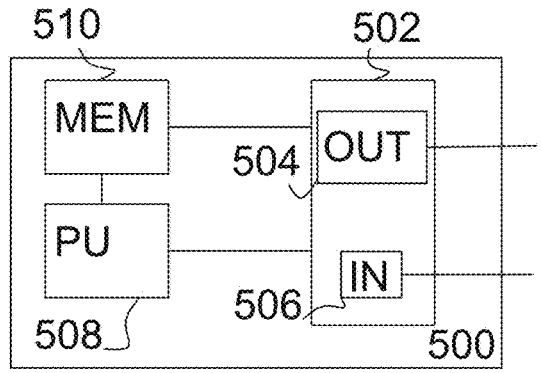
FIG. 5a is a general block diagram of an apparatus according to an exemplary embodiment.

FIG. 5a is a general block diagram of an exemplary apparatus according to an embodiment. The apparatus may include a service center or a MCD, or a controller unit described in the embodiments. Although the apparatus has been depicted as one entity, different modules and memory may be implemented in one or more physical or logical entities.

The apparatus may operate as a terminal suitable for operating as a termination point for telecommunication sessions. Examples of the terminal include but are not limited to user equipment (UE), a mobile phone, communicator, PDA, application server or a computer.

The apparatus 500 can include an interfacing unit 502, a central processing unit (CPU) 508, and a memory 510, that are all being electrically interconnected. The interfacing unit can include an input 506 and an output unit 504 that provide, respectively, the input and output interfaces to the apparatus. The non-transitory memory may include one or more applications that are executable by the CPU. The input and output units may be configured or arranged to send and receive data, and/or messages according to one or more protocols used in the above-mentioned communication standards.

In an exemplary embodiment the input unit may provide circuitry for obtaining data, commands, user input, control commands, selection information and/or messages to the apparatus. The obtaining may include receiving radio frequency signals by an antenna, for example. In another example, the obtaining may include receiving wired transmissions via an Ethernet adapter. In yet another example, the obtaining may include receiving input from a user via a user input device including one or more of a keyboard, computer mouse and/or a touch screen.

In an exemplary embodiment the output unit may provide circuitry for transmitting data, commands, visual signals, control commands, selection information and/or messages from the apparatus. The transmitting may include transmitting radio frequency signals by an antenna, for example. In another example, the transmitting may include transmitting wired transmissions via an Ethernet adapter. In yet another example, the transmitting may include displaying a user interface or a view by visual signals.

In an exemplary embodiment the interfacing unit may include a display for displaying information (e.g., a user interface or a view). The display may be a touchscreen that can detect the presence and location of a touch within the display area. The touching may be provided by human touch or by a device mediating the human touch (e.g., a stylus). Accordingly, a touchscreen may provide receiving the commands from a user and displaying configuration information in response to the command from the user.

The CPU may include a set of registers, an arithmetic logic unit, and a control unit. The control unit can be controlled by a sequence of program instructions transferred to the CPU from the memory. The control unit may contain a number of microinstructions for basic operations. The implementation of micro-instructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions. The memory may be a volatile or a non-volatile memory, for example EEPROM, ROM, PROM, RAM, DRAM, SRAM, firmware, programmable logic, etc.

The apparatus 500 may be implemented as an electronic digital computer, which may include a working memory (RAM), a central processing unit (CPU), and a system clock. The CPU may include a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

Figure 5B:
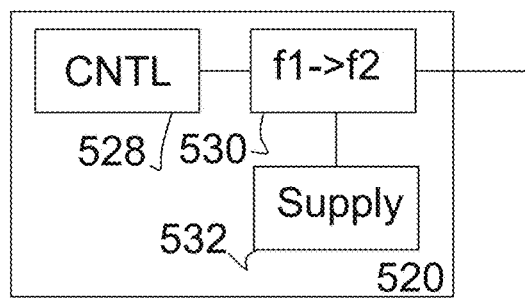
FIG. 5b is a general block diagram of a frequency converter according to an exemplary embodiment.

FIG. 5b is a general block diagram of a frequency converter according to an exemplary embodiment. The frequency converter can include a controller 528, a converter unit 530 and a power supply unit or power supply connector 532. Electrical power is received to the frequency converter via the power supply connector. The received electrical power is fed to the converter unit, where the input power is converted to an output frequency under the control of the controller unit. FIG. 5a represents a general block diagram of an exemplary apparatus capable of operating as the control unit. When the frequency converter is operational, the control unit of the frequency converter may communicate with the MCD that displays the user interface of the frequency converter and provides remote control of the frequency converter for a service center, as described in the above embodiments. The control unit of the frequency converter and the mobile communications unit may execute software that provides their communication and control of the frequency converter by control commands from the MCD. The software may be executed on an operating system ran on the mobile communications system and the control unit.

An exemplary embodiment provides a computer program embodied on a distribution medium, having program instructions which, when loaded into an electronic apparatus, cause the execution of a method according to an exemplary embodiment.

The computer program may be in source code form, object code form, or in some intermediate form, and it may be stored in some sort of non-transitory carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

The apparatus according to an exemplary embodiment may be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the specifications and/or requirements set for the size and power consumption of the apparatus 500, 520, desired or necessary processing capacity, production costs, and production volumes, for example.

An apparatus according to an exemplary embodiment may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection.

Examples of the user terminal include a personal computer, a game console, a laptop (a notebook), a personal digital assistant, a tablet computer, a mobile station (mobile phone), and a line telephone.

Apparatuses, such as MCDs and/or other corresponding devices or apparatuses implementing the functionality of a corresponding apparatus described with an exemplary embodiment can include not only known, state-of-the-art means, but also means for establishing a short range wireless connection to a frequency converter that is adapted to receive electrical power having a first frequency and output electrical power having a second frequency, establishing a connection over a wide area network to a service center maintaining information associated with frequency converters, receiving operational information from the frequency converter, and relaying the received operational information to the service center.

Apparatuses, such as a drive system or a frequency converter and/or other corresponding devices or apparatuses implementing the functionality of a corresponding apparatus described with exemplary embodiments include not only known state-of-the-art means, but also means for establishing a short range wireless connection to a MCD, transmitting operational information of the frequency converter to the MCD, receiving control commands for the frequency converter from the MCD, said control commands being determined on the basis of selections received from a service center maintaining information associated with frequency converters, in response to a view of the user interface of the frequency converter conveyed to the service center.

Apparatuses, such as a service center, server, a data processing device and/or other corresponding devices or apparatuses implementing the functionality of a corresponding apparatus described with exemplary embodiments can include not only known state-of-the-art means, but also means for receiving from the MCD a view of the frequency converter user interface, the MCD being connected to the frequency converter over a short range wireless connection, displaying the view, receiving input to the displayed view, determining at least one part of view corresponding to the received input, and transmitting the received input and information identifying the determined part of the view corresponding to the received input for controlling the frequency converter.

More precisely, the apparatuses described with exemplary embodiments may include means for implementing functionality of a corresponding apparatus described with exemplary embodiments and they may include separate means or units for each separate function, or means may be configured to perform two or more functions. Present apparatuses can include processors and memory that can be utilized in an embodiment. Programs, also called program products, including software routines, applets and macros, can be stored in any apparatus-readable data storage medium and they include program instructions to perform particular tasks. All modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a drive system or a frequency converter or a MCD or a service center, or a corresponding component, may be configured as a computer or a microprocessor, such as single-chip computer element, including at least a memory for providing storage area used for arithmetic operation and an operation processor for executing the arithmetic operation. An example of the operation processor includes a central processing unit. The memory may be removable memory detachably connected to the apparatus.

Exemplary embodiments are, for example, applicable to any drive system or frequency converter or MCD or service center that are involved remote management of frequency converters. The steps/points, signaling messages and related functions described with respect to FIGS. 2 and 4 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point. The operations of a drive system or a frequency converter or a MCD or a service center illustrate a procedure that may be implemented in one or more physical or logical entities. The signaling messages are only exemplary and may even include several separate messages for transmitting the same information. In addition, the messages may also contain other information.

Those skilled in the art will appreciate that, as technology advances, inventive concepts disclosed herein can be implemented in various ways. The invention and its embodiments are not limited to the examples described herein but may vary within the scope of the claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method of remotely operating a frequency converter for a mobile communications device that includes a user interface for displaying information to a user and communications means for connecting to end points on a short range wireless connection and over a wide area network, wherein the method comprises:
   establishing a short range wireless connection to a frequency converter that is configured to receive electrical AC power having a first frequency from a power supply, and output electrical AC power having a second frequency to a load;
   establishing a connection over a wide area network to a service center maintaining information associated with frequency converters;
   receiving operational information from the frequency converter;
   generating a frequency converter user interface based on the received operational information;
   generating a view of the frequency converter user interface;
   relaying the view of the frequency converter user interface over a wide area network to the service center;
   receiving control commands for the frequency converter from the service center, wherein the control commands comprise input received to a location on the service center user interface and information identifying at least one determined part of the view of the frequency converter user interface corresponding to the received input; and
   relaying the control commands to the frequency converter.

2. A method of remotely operating a frequency converter that is configured to receive electrical AC power having a first frequency from a power supply and output electrical AC power having a second frequency to a load, wherein the frequency converter includes communications means for establishing connections to end points over a short range wireless connection, the method comprising:
   establishing a short range wireless connection to a mobile communications device;
   transmitting operational information of the frequency converter to the mobile communications device;
   receiving control commands for the frequency converter from the mobile communications device, said control commands being determined based on selections received from a service center maintaining information associated with frequency converters, in response to a view of a user interface of the frequency converter conveyed to the service center, wherein the control commands comprise input received to a location on the service center user interface and information identifying at least one determined part of the view of the frequency converter user interface corresponding to the received input.

3. A method according to claim 1, comprising:
   receiving from the service center selection information of selections associated with a view of the frequency converter user interface transmitted to the service center;
   determining a selection of the frequency converter user interface that corresponds to the received selection information associated with the view; and
   determining a control command of the frequency converter based on the determined selection for controlling the frequency converter based on the selections associated with the view received from the service center.

4. A method according to claim 3, comprising:
   transmitting a control command corresponding to a frequency converter user interface selection to the frequency converter in response an authorization obtained by the mobile communications device, said authorization obtained via a prompt to a user of the mobile communications device or reading a near field communications NFC tag.

5. A method according to claim 1, wherein the user interface includes a selection element having a first position and a second position, the method comprising:
   relaying a view of the user interface to the service center via the first position, the user interface being local to the mobile communications device via the second position.

6. A method according to claim 1, wherein the user interface comprises one or more of the following elements:
   an on/off switch, fault information, parameter view, rotation speed reference and rotation speed.

7. A method according to claim 1, wherein selection information is received from the service center, said selection information comprising:
   information of user input and at least one part of the user interface view corresponding to the user input.

8. A method according to claim 1, wherein the view comprises:
   a graphical representation of the user interface.

9. A method according to claim 1, comprising:
   controlling the frequency converter by control commands determined by selections on a user interface, said control commands being communicated to the frequency converter over a short range wireless connection, wherein the controlling includes configuring, by setting one or more parameters, the frequency converter and on a selection made on the user interface or a view of the user interface.

10. A method according to claim 1, wherein selections on the user interface or a view of the user interface comprise:
one or more parameters of the frequency converter, said parameters including at least one from a output voltage, output frequency and application specific information represented by at least one of a torque and/or rotation speed.

11. A method according to claim 2, comprising:
controlling the frequency converter based on control commands received from the mobile communications device via a short range wireless connection, said control commands being generated based on user selections on a frequency converter user interface view generated by a mobile communications device, said user interface view being relayed by the mobile communications device to the service center over a wide area network.

12. A method according to claim 1, comprising:
maintaining operational information of the frequency converter and determining a new operational information of the frequency converter based on selection information on the frequency converter user interface view received from the service center.

13. A method according to claim 1, wherein a short range wireless connection comprises:
a Bluetooth connection, a wireless local area network WLAN connection, an infrared connection or a near field communications NFC connection.

14. A method according to claim 1, wherein a wide area network, for example Internet, comprises:
at least two sub-networks, at least one of which is a mobile communications network or a wired access network, connected by one or more routers.

15. A mobile communications device, comprising:
a user interface for displaying information to a user;
communications means for connecting to end points on a short range wireless connection and over a wide area network, and at least one processor; and
at least one non-transitory memory including a computer program code, wherein the at least one memory and the computer program code are configured for, with the at least one processor, user interface and communications means at least:
establishing a short range wireless connection to a frequency converter that is adapted to receive electrical AC power having a first frequency from a power supply and output electrical AC power having a second frequency to a load;
establishing a connection over a wide area network to a service center maintaining information associated with frequency converters;
receiving operational information from the frequency converter;
generating a frequency converter user interface based on the received operational information;
generating a view of the frequency converter user interface;
relaying the view of the frequency converter user interface over a wide area network to the service center;
receiving control commands for the frequency converter from the service center, wherein the control commands comprise input received to a location on the service center user interface and information identifying at least one determined part of the view of the frequency converter user interface corresponding to the received input; and
relaying the control commands to the frequency converter.

16. A frequency converter configured for receiving electrical AC power having a first frequency from a power supply and outputting electrical AC power having a second frequency to a load, comprising:
communications means for establishing connections to end points over a short range wireless connection; and
at least one processor and at least one non-transitory memory including a computer program code, wherein the at least one memory and the computer program code are configured for, with the at least one processor, and communications means at least:
establishing a short range wireless connection to a mobile communications device;
transmitting operational information of the frequency converter to the mobile communications device; and
receiving control commands for the frequency converter from the mobile communications device, said control commands being determined based on selections received from a service center maintaining information associated with frequency converters, in response to a view of the user interface of the frequency converter conveyed to the service center, wherein the control commands comprise input received to a location on the service center user interface and information identifying at least one determined part of the view of the frequency converter user interface corresponding to the received input.

17. A service center for maintaining information associated with frequency converters, comprising:
a user interface for displaying data and for receiving user input;
communications means for establishing a connection to a mobile communications device over a wide area network, said frequency converters being adapted to receive electrical AC power having a first frequency from a power supply and output electrical AC power having a second frequency to a load; and
at least one processor and at least one non-transitory memory including a computer program code, wherein the at least one memory and the computer program code are configured for, with the at least one processor, user interface, and communications means, at least:
receiving from the mobile communications device a view of the frequency converter user interface, said mobile communications device being connected to the frequency converter over a short range wireless connection;
displaying the view;
receiving input to the displayed view;
associating the received input to a location on the service center user interface;
determining at least one part of the view of the frequency converter user interface corresponding to the received input on the service center user interface, wherein the input received at the location on the service center user interface is mapped to a location of the view of the frequency converter user interface; and
transmitting the received input and information identifying the determined part of the view of the frequency converter user interface corresponding to the received input for controlling the frequency converter.

18. A computer program embodied on a non-transitory distribution medium, having program instructions which, when loaded into a mobile communications device that has a user interface for displaying information to a user and communications means for connecting to end points on a short range wireless connection and over a wide area network, will cause execution of steps comprising:
   establishing a short range wireless connection to a frequency converter that is adapted to receive electrical AC power having a first frequency from a power supply and output electrical AC power having a second frequency to a load;
   establishing a connection over a wide area network to a service center maintaining information associated with frequency converters;
   receiving operational information from the frequency converter;
   generating a frequency converter user interface based on the received operational information;
   generating a view of the frequency converter user interface;
   relaying the view of the frequency converter user interface over a wide area network to the service center;
   receiving control commands for the frequency converter from the service center, wherein the control commands comprise input received to a location on the service center user interface and information identifying at least one determined part of the view of the frequency converter user interface corresponding to the received input; and
   relaying the control commands to the frequency converter.

19. A computer program embodied on a non-transitory distribution medium, having program instructions which, when loaded into a frequency converter that is adapted to receive electrical AC power having a first frequency from a power supply and output electrical AC power having a second frequency to a load, wherein the frequency converter includes communications means for establishing connections to end points over a short range wireless connection, will cause execution of steps comprising:
   establishing a short range wireless connection to a mobile communications device;
   transmitting operational information of the frequency converter to the mobile communications device; and
   receiving control commands for the frequency converter from the mobile communications device, said control commands being determined based on selections received from a service center maintaining information associated with frequency converters, in response to a view of a user interface of the frequency converter conveyed to the service center, wherein the control commands comprise input received to a location on the service center user interface and information identifying at least one determined part of the view of the frequency converter user interface corresponding to the received input.

20. A computer program embodied on a non-transitory distribution medium, having program instructions which, when loaded into a service center maintaining information associated with frequency converters and including a user interface for displaying data and for receiving user input, said frequency converters being adapted to receive electrical AC power having a first frequency from a power supply and output electrical AC power having a second frequency to a load, and communications means for establishing a connection to a mobile communications device over a wide area network, will cause execution of steps comprising:
   receiving from the mobile communications device a view of the frequency converter user interface, said mobile communications device being connected to the frequency converter over a short range wireless connection;
   displaying the view;
   receiving input to the displayed view;
   associating the received input to a location on the service center user interface;
   determining at least one part of the view of the frequency converter user interface corresponding to the received input on the service center user interface, wherein the input received at the location on the service center user interface is mapped to a location of the view of the frequency converter user interface; and
   transmitting the received input and information identifying the determined part of the view of the frequency converter user interface corresponding to the received input for controlling the frequency converter.

21. A drive system comprising:
   a frequency converter configured for receiving AC electrical power having a first frequency from a power supply and outputting AC electrical power having a second frequency to an electric motor, wherein the frequency converter includes communications means for establishing connections to end points over a short range wireless connection, and at least one processor and at least one non-transitory memory including a computer program code, wherein the at least one memory and the computer program code are configured for, with the at least one processor and the communications means, at least:
   establishing a short range wireless connection to a mobile communications device;
   transmitting operational information of the frequency converter to the mobile communications device; and
   receiving control commands for the frequency converter from the mobile communications device, said control commands being determined based on selections received from a service center maintaining information associated with frequency converters, in response to a view of a user interface of the frequency converter conveyed to the service center by the mobile communications device, when a mobile communications device is connected to the frequency converter by the short range wireless connection, wherein the control commands comprise input received to a location on the service center user interface and information identifying at least one determined part of the view of the frequency converter user interface corresponding to the received input.

22. A method of remotely operating a frequency converter by a service center maintaining information associated with frequency converters, and having a user interface for displaying data and for receiving user input, and communications means for establishing a connection to a mobile communications device over a wide area network, the frequency converter being configured to receive electrical AC power having a first frequency from a power supply and output electrical AC power having a second frequency to a load, wherein the method comprises:
   receiving from the mobile communications device a view of the frequency converter user interface, said mobile communications device being connected to the frequency converter over a short range wireless connection;

displaying the view;

receiving input to the displayed view;

associating the received input to a location on the service center user interface;

determining at least one part of the view of the frequency converter user interface corresponding to the received input on the service center user interface, wherein the input received at a location on the service center user interface is mapped to a location of the view of the frequency converter user interface; and transmitting the received input and information identifying the determined part of the view of the frequency converter user interface corresponding to the received input for controlling the frequency converter.

23. A method according to claim 22, wherein the view comprises:

a graphical representation of the user interface.

* * * * *